United States Patent [19]

Beauviala et al.

[11] Patent Number: 4,627,695
[45] Date of Patent: Dec. 9, 1986

[54] DEVICE FOR AUTOMATICALLY METERING AND DISPLAYING THE FOOTAGE OF DELIVERED FILM CONTAINED IN EACH OF A PLURALITY OF INTERCHANGEABLE MAGAZINES ADAPTED TO BE MOUNTED ON THE BODY OF A CINEMATOGRAPHIC CAMERA

[75] Inventors: Jean-Pierre Beauviala, Grenoble; Jean-Pierre Charras, Brignoud, both of France

[73] Assignee: Societe Anonyme dite: Aaton Rg., Grenoble, France

[21] Appl. No.: 784,895

[22] Filed: Oct. 7, 1985

[30] Foreign Application Priority Data

Oct. 8, 1984 [FR] France ................. 84 15392

[51] Int. Cl.$^4$ ............................................. G03B 23/02
[52] U.S. Cl. .................... 352/72; 352/78 R; 352/172; 352/136
[58] Field of Search ............. 352/170, 172, 72, 78 R, 352/136

[56] References Cited

U.S. PATENT DOCUMENTS

| | | |
|---|---|---|
| 3,593,294 | 7/1971 | Kohorn . |
| 3,669,532 | 6/1972 | Figge et al. ............. 352/78 C |
| 3,858,967 | 1/1975 | O'Donnell ................. 352/84 |
| 3,918,802 | 11/1975 | Sakaguchi et al. .......... 352/172 |
| 3,977,776 | 8/1976 | Wagensonner et al. ........ 352/172 |
| 4,114,995 | 9/1978 | Stieringer et al. .......... 352/172 |
| 4,174,888 | 11/1979 | Hunn et al. ............. 352/172 |
| 4,281,909 | 8/1981 | Ishibashi et al. .......... 352/136 |

FOREIGN PATENT DOCUMENTS 2212945 7/1974 France .
2452129 10/1980 France .

*Primary Examiner*—Monroe H. Hayes
*Attorney, Agent, or Firm*—Sandler & Greenblum

[57] ABSTRACT

A device for automatically metering and displaying the footage of delivered film contained in each of a plurality of interchangeable magazines adapted to be mounted on the body of a cinematographic camera comprises, on each magazine, an assembly of coded identification marks peculiar to each magazine. On the body of the camera, there is provided a device for reading and identifying the various assemblies of coded marks borne by the various magazines. The camera includes a memory with a plurality of zones allocated respectively to the various magazines and permanently containing information relative to the footage of flim consumed in each magazine. The camera also includes a microprocessor receiving signals coming from the device for identifying the magazines, as well as a metering pulse emitted by a pulse generator coupled to the motor driving the film and emitting a pulse for each image.

5 Claims, 3 Drawing Figures

DEVICE FOR AUTOMATICALLY METERING AND DISPLAYING THE FOOTAGE OF DELIVERED FILM CONTAINED IN EACH OF A PLURALITY OF INTERCHANGEABLE MAGAZINES ADAPTED TO BE MOUNTED ON THE BODY OF A CINEMATOGRAPHIC CAMERA

BACKGROUND OF THE INVENTION

The present invention relates to a device for automatically metering and displaying the footage of delivered film contained in each of a plurality of interchangeable magazines adapted to be mounted on the body of a cinematographic camera.

16 mm cinematographic film cameras currently use interchangeable magazines which are used selectively for filming various sequences. Consequently, such cameras pose the problem of identifying the magazine during use and of knowing, each time a new magazine is mounted on the body of the camera, the length of film that it contains and which has already been used in the course of filming previous sequences.

SUMMARY OF THE INVENTION

It is an object of the present invention to solve this problem by particularly simple means for identifying the magazines and for displaying for footage of film already used in each of them.

To this end this device for automatically metering and displaying the footage of delivered film contained in each of a plurality of interchangeable magazines adapted to be mounted on the body of a cinematographic camera comprises, on each magazine, an assembly of coded identification marks peculiar to each magazine and, on the body of the camera, a device for reading and identifying the various assemblies of coded marks borne by the various magazines, a memory with a plurality of zones allocated respectively to the various magazines and permanently containing information relative to the footage of film consumed in each magazine, a microprocessor receiving signals coming from the device for identifying the magazines, as well as a metering pulse emitted by a pulse generator coupled to the motor driving the film and emitting a pulse for each image, and a display device connected to the microprocessor for indicating at any moment the footage of film delivered and contained in the magazine used.

BRIEF DESCRIPTION OF THE DRAWINGS

The invention will be more readily understood on reading the following description with reference to the accompanying drawings, in which.

DESCRIPTION OF THE PREFERRED EMBODIMENTS

Figure 1:
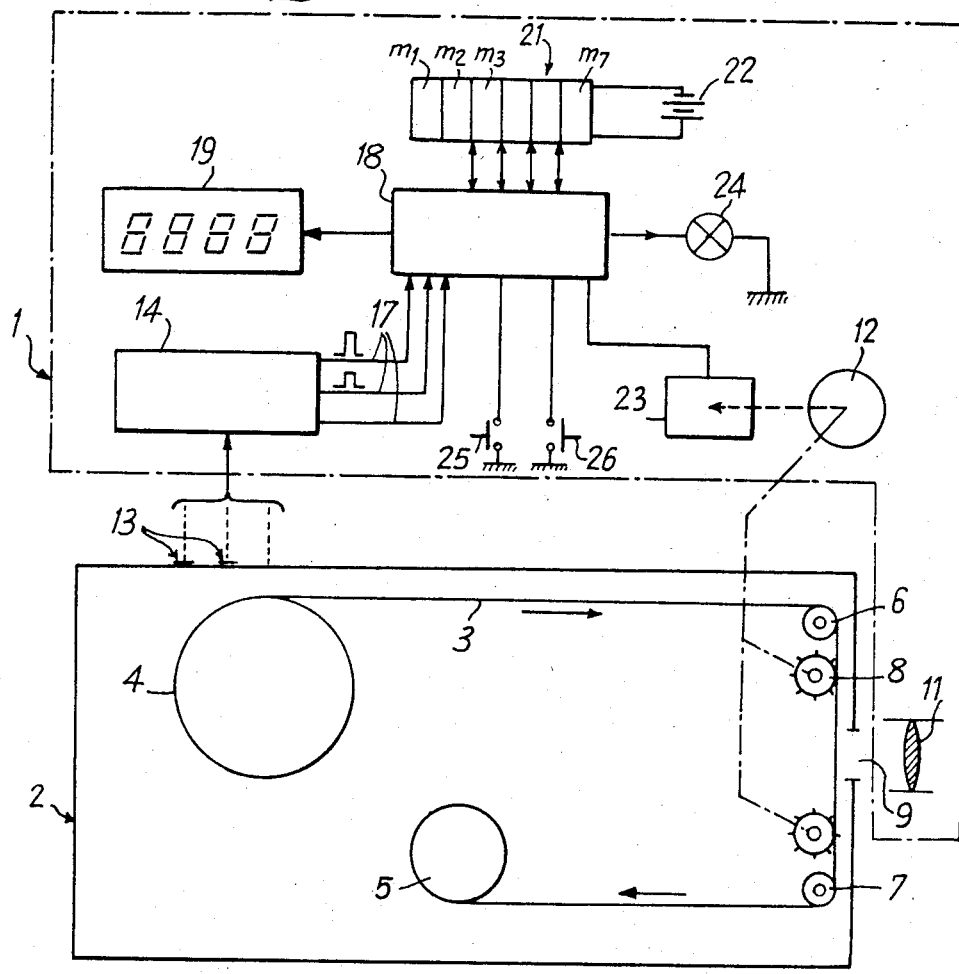
FIG. 1 is a block diagram a device for automatically metering and displaying the footage of delivered film contained in each of a plurality of interchangeable magazines adapted to be mounted on the body of a cinematographic camera.
Figure 2:
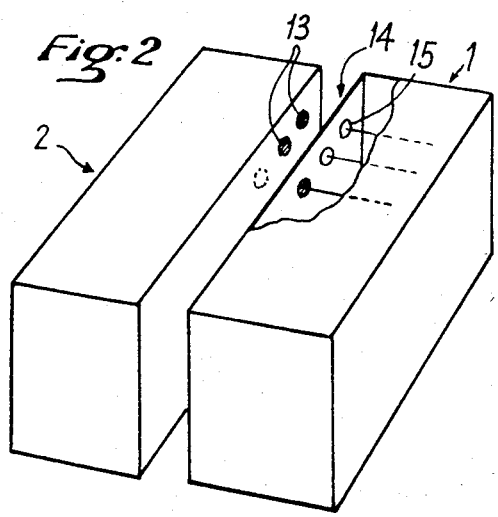
FIG. 2 is a perspective view of the magazine identification device.

Referring now to the drawings, the device according to the invention is incorporated in the body 1 of a cinematographic camera shown in chain-dotted lines in FIG. 1, and on which various interchangeable magazines 2, each containing a cinematographic film 3, may be adapted. In manner known per se, each magazine 2 contains a supply reel 4, a take-up reel 5, rollers 6,7 for guiding the film and sprocket capstans 8 driving the film and advancing it in front of a window 9 placed in front of the lens 11 of the camera, when the magazine is mounted on the body 1. The film is driven by means of an electric motor 12 housed in the body 1 of the camera.

According to the invention each magazine 2 bears, on one of its walls, an assembly of coded identification marks 13 which univocally identify the magazine in question. These marks 13 are advantageously constituted by magnets which are permanently fixed on the wall of the magazine or are removable. These marks 13 are disposed in a binary code. For example, if each identification assembly comprises three marks 13, respectively allocated to bits of weight 1,2 and 4, it is possible to identify, by means of the various combination of bits, seven magazines.

The body 1 of the camera contains, near the locations of the identification marks 13 of the magazine 2 when the latter is mounted on the body 1, a magazine identification device 14 which is preferably a device of the type without magnetic contact. This device consequently comprises, on the body 1 of the camera, three magneto-sensitive sensors 15, such as Hall probe sensors currently used in certain computer Reyboards, of flexible blade switches or reed relays. When a magazine 2 is mounted on the body 1 of the camera, each of the identification magnets 13 borne by the magazine 2 lies opposite a magneto-sensitive sensor 15 which is associated therewith. Consequently, the magazine identification device 14 emits at its output a train of binary signals of which the combination corresponds univocally to the magazine 2 mounted on the body 1 of the camera.

Figure 3:
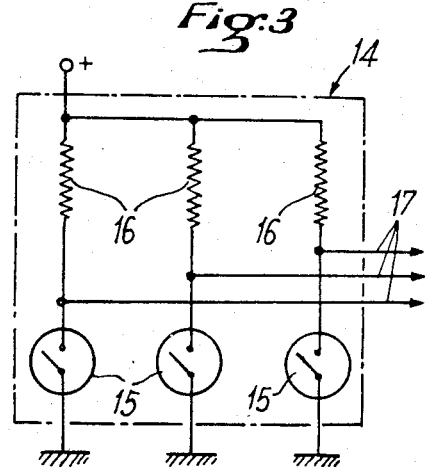
FIG. 3 is an electrical diagram the magazine identification device.

The electrical diagram of the identification device 14 may be such as the one illustrated in FIG. 3. The three magneto-sensitive sensors 15 are seen to be connected in parallel each of them in series with a respective resistor 16, between the terminals of a D.C. supply source. The output conductors 17 of the magazine identification device 14 are connected to the respective points of junction between the resistors 16 and the magneto-sensitive sensors 15. When no magazine 2 is mounted on the body of the camera 1, the three magneto-sensitive sensors are normally open, and three logic "1" signals are present on the three output conductors 17. On the contrary, when a magazine is engaged in the camera, the or each of the magnets 13 present on this magazine provokes the closure of one or more of the magneto-sensitive sensors, which brings about the appearance, on the or each corresponding output conductor 17, of a logic "0" signal (low level). Consequently, depending on the distribution (number and position) of the magnets 13 constituting the identification marks on each magazine 2, the magazine identification device 14 emits a particular assembly of signals "0" and "1", i.e. of logic levels.

Furthermore, the body 1 of the camera contains an electronic assembly constituted by a microprocessor 18, for exmple of the 8749 INTEL type, connected to a display device 19 and a memory 21 for safeguarding the information. This memory 21 is itself connected to a safeguard battery 22 which maintains a permanent supply of this memory, whatever the state of the camera.

The microprocessor 18 is also connected to a pulse generator 23 which is coupled to the motor 12 for driving the film and which emits a pulse at each image, as well as to a warning lamp 24, and function switch knobs 25 and 26.

The microprocessor 18 thus receives the logic levels present on the three conductors 17 and coming from the magazine identification device 14; it also receives pulses coming from the function switches 25,26 and also pulses emitted by the generator 23 coupled to the motor 12.

Each time a magazine 2 is mounted on the body 1 of the camera the microprocessor 18 identifies the magazine used from the code constituted by the logic levels emitted by the magazine identification device 14. It then determines, from memory 21, the footage of film already used and which was previously memorized in the corresponding zones among the seven zones $m_1, m_2, m_3 \ldots m_7$ allocated respectively to the seven magazines used. The fotage used is then indicated by the display device 19, controlled by the microprocessor 18. As the camera turns, the microprocessor 18 receives from generator 23 a pulse for each image recorded; it then permanently calculates the footage used and it displays it clearly by means of device 19.

The warning lamp 24 which may be constituted by an electro-luminescent diode or any other sound or visual means, has been provided to be energized in a certain manner (continuous or intermittent lighting), by the microprocessor 18 when almost all the film 3 contained in the magazine 2 used has been consumed and in another manner (for example blinking at different frequency) when all the film has been used.

The use of the microprocessor 18 also allows complementary functions such as the initialization of the footage of the magazine engaged, by return to zero or to any value of the film meter, by action on the function switches 25 and 26.

We claim:

1. A device for automatically metering and displaying the footage of delivered film contained in each of a plurality of interchangeable magazines adapted to be mounted on the body of a cinematographic camera comprising, on each magazine, an assembly of coded identification marks peculiar to each magazine and, on the body of the camera, a device for reading and identifying the various assemblies of coded marks borne by the various magazines, a memory with a plurality of zones allocated respectively to the various magazines and permanently containing information relative to the footage of film consumed in each magazine, a microprocessor receiving signals coming from the device for identifying the magazines, as well as a metering pulse emitted by a pulse generator coupled to the motor driving the film and emitting a pulse for each image, and a display device connected to the microprocessor for indicating at any moment the footage of film delivered and contained in the magazine used.

2. A device according to claim 1, wherein the coded identification marks borne by the various magazines are constituted by magnets and the magazine identification device comprises magneto-sensitive sensors in a number equal to that of the magnets, and lying opposite corresponding magnets when a magazine is mounted on the camera.

3. A device according to claim 1, wherein the memory is connected to a safeguard battery maintaining a permanent supply of said memory.

4. A device according to claim 1, wheren the microprocessor is connected to a warning lamp intended to indicate the approach of the end of the film contained in the magazine.

5. A device according to claim 1, wherein the microprocessor is connected to function switch knobs, particularly for the initialization of the footage of the magazine engaged, by return to zero or to any value of the film meter.

* * * * *